(12) United States Patent
Oliveira et al.

(10) Patent No.: US 12,250,135 B2
(45) Date of Patent: Mar. 11, 2025

(54) INTUITIVE GRAPHICAL NETWORK MAPPING BASED ON COLLECTIVE INTELLIGENCE

(71) Applicant: Cisco Technology, Inc., San Jose, CA (US)

(72) Inventors: Ricardo V. Oliveira, San Francisco, CA (US); Arash Molavi Kakhki, San Francisco, CA (US); Dhirendra Kumar Sinha, Santa Clara, CA (US); Conley Read, San Francisco, CA (US); Matias Fontanini, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/876,843

(22) Filed: Jul. 29, 2022

(65) Prior Publication Data

US 2023/0049207 A1 Feb. 16, 2023

Related U.S. Application Data

(60) Provisional application No. 63/227,964, filed on Jul. 30, 2021.

(51) Int. Cl.
| | | |
|---|---|---|
| *H04L 43/10* | (2022.01) | |
| *H04L 43/045* | (2022.01) | |
| *H04L 41/046* | (2022.01) | |
| *H04L 41/12* | (2022.01) | |
| *H04L 41/122* | (2022.01) | |
| *H04L 41/22* | (2022.01) | |
| *H04L 41/50* | (2022.01) | |
| *H04L 41/5009* | (2022.01) | |
| *H04L 43/08* | (2022.01) | |

(Continued)

(52) U.S. Cl.
CPC ............ *H04L 43/10* (2013.01); *H04L 43/045* (2013.01)

(58) Field of Classification Search
None
See application file for complete search history.

(56) References Cited

U.S. PATENT DOCUMENTS

| 8,032,867 B2 | 10/2011 | Bansal |
|---|---|---|
| 10,114,727 B2 | 10/2018 | Lindo et al. |

(Continued)

*Primary Examiner* — John A Follansbee
*Assistant Examiner* — Kamal M Hossain
(74) *Attorney, Agent, or Firm* — BEHMKE INNOVATION GROUP LLC; James M. Behmke; James J. Wong

(57) ABSTRACT

In one embodiment, a method comprises: obtaining, by a process, path trace data collected by a plurality of performance monitoring agents across a computer network; obtaining, by the process, one or more catalogs having application-based correlation information for the path trace data; generating, by the process, network mapping directed graphs by correlating the path trace data using the one or more catalogs, the network mapping directed graphs logically comprising nodes categorized at a plurality of levels of aggregation and edges connecting the nodes; associating, by the process, test-based performance data with the edges of the network mapping directed graphs; and providing, by the process, at least one Sankey diagram based on the network mapping directed graphs and test-based performance data associated with their edges for selectable display by a user interface.

20 Claims, 8 Drawing Sheets

(51) Int. Cl.
   *H04L 43/12*   (2022.01)
   *H04L 43/50*   (2022.01)
   *H04L 45/00*   (2022.01)

(56) References Cited

U.S. PATENT DOCUMENTS

| | | |
|---|---|---|
| 11,017,368 B2 | 5/2021 | Bulumulla et al. |
| 2015/0081701 A1* | 3/2015 | Lerios ................... G06F 16/955 707/736 |
| 2017/0366421 A1* | 12/2017 | Dam ..................... H04L 43/045 |
| 2018/0123903 A1* | 5/2018 | Holla ...................... H04L 45/02 |
| 2018/0123919 A1 | 5/2018 | Naous et al. |
| 2019/0347634 A1 | 11/2019 | Bulumulla et al. |
| 2021/0342394 A1 | 11/2021 | Fletcher et al. |
| 2022/0046038 A1* | 2/2022 | Sinha ................. H04L 63/0236 |

* cited by examiner

INTUITIVE GRAPHICAL NETWORK MAPPING BASED ON COLLECTIVE INTELLIGENCE

RELATED APPLICATION

This application claims priority to U.S. Provisional Appl. Ser. No. 63/227,964, filed Jul. 30, 2021, entitled INTUITIVE GRAPHICAL NETWORK MAPPING BASED ON COLLECTIVE INTELLIGENCE, by Oliveira, et al., the contents of which are incorporated herein by reference in its entirety.

TECHNICAL FIELD

The present disclosure relates generally to computer systems, and, more particularly, to intuitive graphical network mapping based on collective intelligence.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, network monitoring solutions are currently available that allow customers to monitor resources that impact performance of the customers' applications, services, etc. Visibility into such resources may be based on a suite of "agents" or pieces of software that are installed in different locations and devices in different computer and/or communications networks (e.g. around the world). Generally, however, current offerings that attempt to illustrate how applications connect to the Internet are generally not user friendly or coherent, and do not fully capture the intricacies and dependencies of the connectivity.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
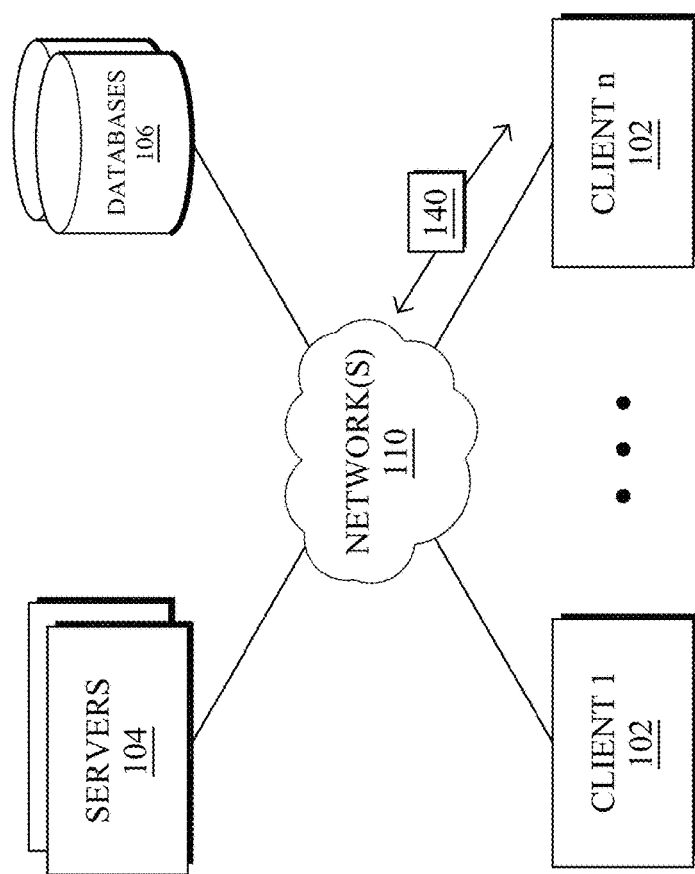
FIG. 1 illustrates an example computer network.

According to one or more embodiments of the disclosure, the techniques herein are directed toward intuitive graphical network mapping based on collective intelligence.

The techniques herein provide a complete visualization tool for illustrating the interconnection of applications and network services to the Internet in steady state. In particular, through the high-scale collection of application operation data, the techniques herein can piece together the interconnections and dependencies, aggregating and summarizing the data based on a number of filters (e.g., applications, services, geography, service providers, enterprises, etc.) and enriching the data with performance metrics and other useful information to help customers understand the overall picture of the Internet.

That is, the idea of intuitive graphical network mapping based on collective intelligence herein (or simply "network maps view") is to have a visualization "magnifying glass" around an application or service provider, being able to see which locations each of them are hosted on, which ISPs they are connected to, etc. The techniques herein are able to zoom in down to the interface level and see how each node in the application/service provider is connected with each other and with edge nodes, etc.

Specifically, according to one or more embodiments of the disclosure, an example method herein comprises: obtaining, by a process, path trace data collected by a plurality of performance monitoring agents across a computer network; obtaining, by the process, one or more catalogs having application-based correlation information for the path trace data; generating, by the process, network mapping directed graphs by correlating the path trace data using the one or more catalogs, the network mapping directed graphs logically comprising nodes categorized at a plurality of levels of aggregation and edges connecting the nodes; associating, by the process, test-based performance data with the edges of the network mapping directed graphs; and providing, by the process, at least one Sankey diagram based on the network mapping directed graphs and test-based performance data associated with their edges for selectable display by a user interface.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus.

WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
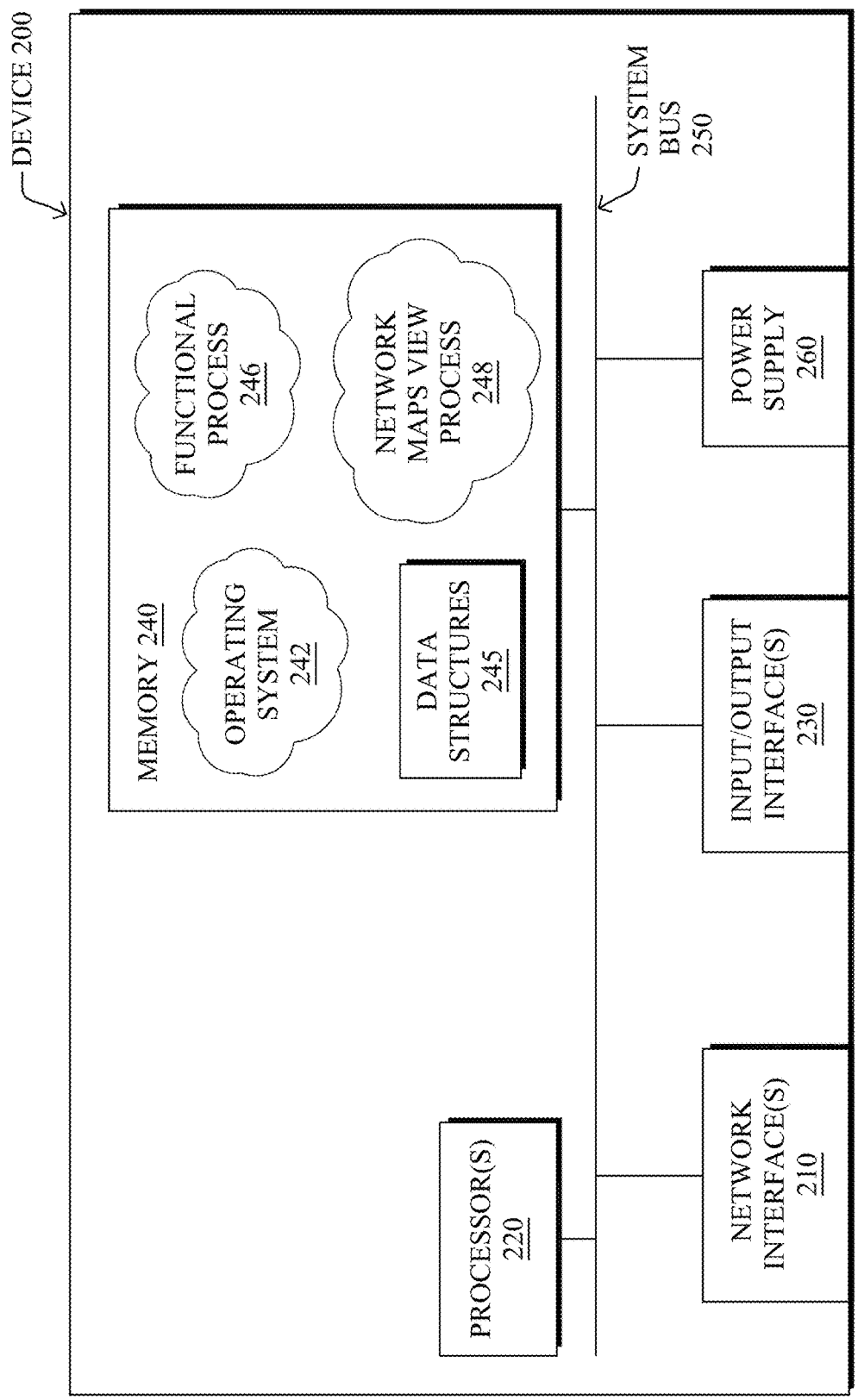
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, for example, wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative network maps view process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming, if not impossible (e.g., for a mere user of the SaaS service). For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and end point agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
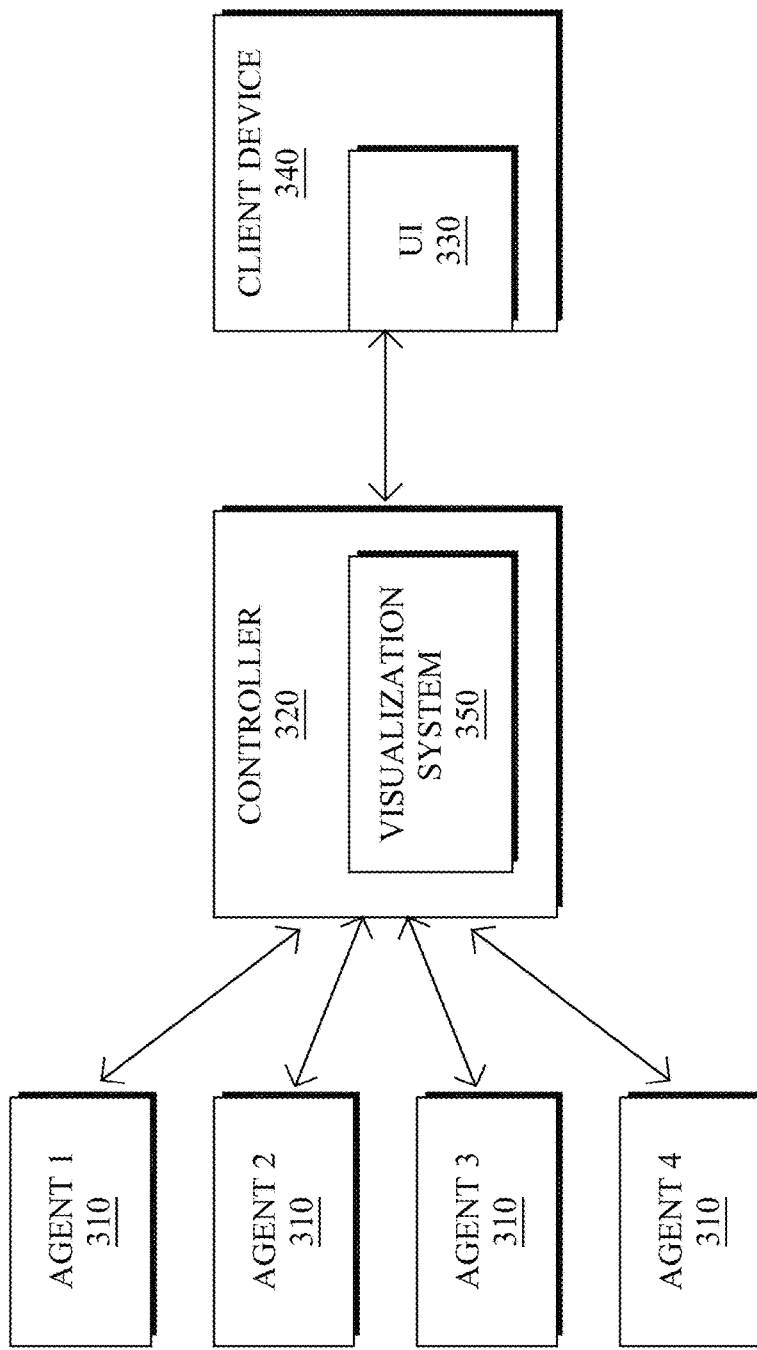
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controller 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controller 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, or a datacenter at the core of the edge of a network, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Intuitive Graphical Network Mapping Based on Collective Intelligence—

Visualization of the Internet, demonstrating how millions of different devices are interconnected, has been a topic of research since the inception of the Internet. Currently, however, most visualization tools are still lacking robust features, and primarily focus on how nodes/devices (e.g., routers, switches, access points, firewalls, load balancers, servers, databases, and so on) are linked together (e.g., wired and/or wirelessly). Such tools often provide aggregation and summarization of the devices and the paths between the devices, but still mostly are concentrated on the network layer and its physical connectivity.

What is lacking today is the ability to visualize the interconnection of applications and network services to the Internet in steady state. For instance, applications and network services, in particular, are not generally a singular "point" within the Internet. That is, different end users and enterprises may be routed through and to different locations within the network to service their applications based on geography, load balancing, content availability, language, and so on, where a plurality of servers, databases, and so on, are configured to operate as "the application" within the Internet. This is particularly more prevalent as applications move from a more centralized model to the Cloud and Software as a Service (SaaS) models. Moreover, a single application may also have many different components and services within it, with different service providers hosting different facets of the application (e.g., video content versus sales backends, etc.).

Being able to coherently illustrate the interconnection of applications and network services to the Internet in steady state has thus been a difficult task, and, as noted above, current offerings have yet to produce a user-friendly and robust solution that could fully capture the intricacies and dependencies of the connectivity.

The techniques herein, on the other hand, do provide such a complete visualization tool for illustrating the interconnection of applications and network services to the Internet in steady state. In particular, through the high-scale collection of application operation data, the techniques herein can piece together the interconnections and dependencies, aggregating and summarizing the data based on a number of filters (e.g., applications, services, geography, service providers, enterprises, etc.) and enriching the data with performance metrics and other useful information to help customers understand the overall picture of the Internet.

That is, the idea of intuitive graphical network mapping based on collective intelligence herein (or simply "network maps view") is to have a visualization "magnifying glass" around an application or service provider, being able to see which locations each of them are hosted on, which ISPs they are connected to, etc. The techniques herein are able to zoom in down to the interface level and see how each node in the application/service provider is connected with each other and with edge nodes, etc.

In particular, as described below, there are three primary use cases that are addressed by the visualization techniques herein:

Self-visibility and monitoring: Customers that want to see how their own apps/networks connect to the Internet. For example, an enterprise may offer a service that is globally accessible, and through an aggregation of collected data (e.g., enterprise agents and cloud agents, as detailed below), the techniques herein can provide that customer with a view of how their entire network/service connects to the rest of the Internet.

Expansion/provider selection/peering: Customers that are in planning phase and want to understand footprint of service providers in each geographical region ("geo"). For example, if an enterprise is looking to expand their service provider coverage, are looking for peering, or are looking to add a new provider in a new geography they plan to expand into, the techniques herein can help this customer understand what providers are available in that region and how their application may be serviced there.

Competitive analysis: Customers that want to understand how a competitor connects to the Internet, or how they perform compared to competitors. For example, if an enterprise wants to be competitive in a certain geo where a competitor already operates, the techniques herein can help this customer understand more about their competitor's presence, their overall footprint, what providers they connect to, and so on.

Operationally, the techniques herein begin with data collection. For example, as noted above, network monitoring solutions are currently available that allow customers to monitor networks and applications that, while not necessarily under the control, management, operation, etc. of the customers, still impact performance of the customers' applications, services, etc. Visibility into such resources may be based on a suite of "agents" or pieces of software that are installed in different locations and devices in different computer and/or communications networks (e.g. around the world).

Examples of different agents, as described herein above, may comprise: a) cloud agents (e.g., deployed and maintained by the network monitoring solution provider), b) enterprise agents (e.g., installed and operated in a customer's network), and c) end point agents, which may be a different version of the previous agents that is installed on actual users' (e.g., employees') devices (e.g., on their web browsers or otherwise). Each of these agents may be configured to run tests from their respective devices, where the tests allow a customer to customize from a suite of tests against different networks and applications or any resource that they are interested in having visibility into. For example, a given test may offer provide visibility into one or more resources of a particular end point (e.g., at a "layer" where the test is being performed). Alternatively, a test may provide visibility into what is in between the end point and another component, for example, how a device is specifically connected through a network to an end resource (e.g., full visibility at various and multiple layers). In operation, essentially, when a customer uses one or more agents to run tests, probe packets travel through the Internet, go through many different networks, measure/monitor a given metric, component, etc., and the network monitoring solution gathers all of that data (e.g., from returned packets, responses, and so on, or, particularly, a lack thereof).

The tests that a given agent performs may comprise HTTP tests (e.g., using curl to connect to a server and load the main document served at the target), Page Load tests (e.g., using a browser to load a full page, in other words, the main document along with all other components that are included in the page), or Transaction tests (e.g., like Page Load test but also performing multiple tasks/steps within given page like, load a shopping website, log in, search for an item, add it to the shopping cart, etc.).

By centrally collecting all of the gathered data from these agents around the world, where the data relates to many different applications and services, the techniques herein can aggregate this data and can build a connectivity map between customers and service providers.

Specifically, the input data to generate this topology illustratively comes from path trace data that both cloud and enterprise agents collect. In another embodiment, the input data also comprises tests consisting of a series of HTTP "Gets" that may be performed periodically, from hundreds or thousands of application end points (e.g., endpoint agents). The techniques herein aggregate the path traces and application test data over a period of time and then generate an output of the determined interconnections. The idea is to not look at this data as composed by "traces" but instead as a large directed graph where there are nodes and edges between nodes, aggregating and enriching data from many different agent sources (e.g., different customers), providing cross application visibility around all the world and around different verticals.

Given the volume of data to be dealt with, the techniques herein write aggregated views of the graphs in the backend, in order to limit the amount of data for the frontend to deal with. In particular, the techniques herein use a model where "nodes" are connected to each other but each "node" can be one of the following:

An interface;
A location; or
A service.

The idea is that the model allows connecting multiple nodes together and describes what each model refers to. If a node refers to a group (e.g., a location) it will also contain the ID of the database (e.g., Mongo) document that contains the graph for that particular group (e.g., the interface level view of that location). This way, the techniques herein can have a model that indicates what the user is looking at, as well as how to go deeper into it.

Note that certain embodiments herein may assume the system wants to store edge nodes ungrouped (e.g., always as single interfaces). The model is flexible enough, however, that the techniques herein could start using higher level groupings and it would still work. If, for example, some location becomes too large (which will likely be the case), the techniques herein could introduce a new grouping layer per prefix (managed transparently by the UI).

Regarding interface metadata, for each interface the techniques herein want to store (if they're available), such as an IP address, autonomous system (autonomous system number, ASN), prefix/netrange, Geoname ID, etc., the techniques herein currently define a link as simply "node A is connected to node B" regardless of what A and B are (they could be locations, prefixes, nodes, etc.). Note that an object is used to define the edge as the techniques herein may can add some metadata to the object, like minimum latency, amount of traces that go through it, etc.

The techniques herein also take into account that the same interface could appear in multiple locations. For cases like this, the techniques herein can identify them by an IP address+geoname_id rather than by just it's address when creating edges between them. Therefore, the key for an interface will be defined as the IP+the geoname_id if the techniques herein have a location for it, otherwise just the IP address can be used.

Also note that large service providers can have several thousands of nodes and dozens of thousands of edges. Rather than writing a single document containing that entire network, which would require storing a several megabytes long document, the techniques herein may split data into locations and store a graph per location, and/or may introduce another layer of split data such as prefix grouping or other splits.

According to one or more embodiments of the techniques herein, a "catalog" may be used to define the different service providers and applications the techniques herein (the backend) are specifically interested in tracking. For example, due to the large amount of potential data (e.g., over 8000 possible applications to monitor), the techniques herein may limit the collection and/or aggregation of data to a select subset thereof, such as the top 100 applications of interest. This catalog may be automatically generated by a script that pulls data from different sources, builds the catalog entries, and writes them into the database (e.g., Mongo MRS). Each catalog entry identifies a particular application/service provider that the techniques herein want to track and specifically how to track it (e.g., only some ASes, prefixes/netranges, URLs, etc.).

The entries in the catalog can be split into different types, such as service providers and application edges.

Regarding service providers, the techniques herein generate a list of service providers of interest (e.g., Amazon). The data each provider publishes (if any) that would allow the techniques herein to split them into different chunks is not consistent at all. For example:
    Amazon publishes the list of netranges it uses for each specific service it provides (e.g. EC2, Cloudfront, etc.), even down to the geographic area they use them on (e.g., US east/west). The techniques herein may limit whether users are allowed to see particular regions (as defined by Amazon, though they'll still be able to view graphs by location).
    Google publishes a list of netranges it uses on GCP but the techniques herein have no more information about them.
    Cloudflare does the same as google, while also advertising their netranges via different ASes.
    Some ISPs like Level 3 don't publish any data at all but the techniques herein still want to be able to track all the ASes they use. The techniques herein have a "siblings" database that will find all ASes for a particular ISP.

Looking at these examples above, the techniques herein should be able to map a specific service provider+service to a set of prefixes (Amazon case), map a specific service provider to a set of prefixes (Google and Cloudflare cases), and map a specific service provider to a set of origin or transit ASes. The metadata the techniques herein will have for these entries in the catalog will have an identifier which will be used as a base for output documents, as well as some description for the UI to be able to show what the data is for. For each provider, the techniques herein define a description using different layers, for example:

Provider name (e.g. Amazon, Level 3).
    Service (e.g. EC2).
    Region where it's served (e.g. US East).

With the above, the techniques herein can identify and describe an entity the techniques herein want to track. Then, for each of these entities the techniques herein would have one or more of the following filters:
    A set of netranges. Any IPs that reside in these prefixes will be written to the output documents for these entities. This would be used for Amazon, Google and Cloudfront, for example.
    A set of ASes. Any IPs that belong to a prefix advertised by any of these ASes would be included in the output document.

Notably, catalog entries can have children. This means, for example, that if A has B and C as children, the techniques herein will generate a graph for both A, B, and C. This is useful in cases like Amazon where the techniques herein want a graph for their entire network but we're also interested in seeing how a particular service (e.g. EC2) looks like. For licensing purposes, a user would only pay for entries that don't have a parent (e.g. Amazon as a whole) and that would enable them to see any children of the entries they pay for. For example, this model would define the catalog entry for AWS.

Besides monitoring service providers, the techniques herein will allow inspecting how specific web applications are hosted and connected to the internet, i.e., the other type of entry in the catalog being application edges. Here, the techniques herein define an application as one or more wildcard domains or ASNs that will be chosen depending on whether the techniques herein have enough traffic towards them so as to make sure the techniques herein only track those for which the techniques herein gather enough data that it's actually useful for clients.

In particular, with regard to full domain tracking, given a particular application that's composed of N_wildcard domains, the techniques herein want to collect data for any full subdomains of them. For example, if the techniques herein want to track *.thousandeyes.com_, then the techniques herein would collect data for share.thousandeyes.com_, app.thousandeyes.com_, etc. It is important to be able to view all of this information split by full domain. So while one could view this from far away and see thousandeyes.com_ and how it connects to the internet, it should also be possible to zoom in and see this information for each individual full domain.

Moreover, at a high level, when a user wants to monitor an application, the techniques herein may:
    a) Display the list of applications the techniques herein have in our catalog, and
    b) After the user has selected them and triggers some action to start tracking them, the techniques herein should start showing data for those domains and all its subdomains. At this point the techniques herein already have the data for them so it's just a matter of the frontend letting them access them. (For example, the techniques herein may use a table in MySQL where it is indicated whether domain X is allowed for org/ account Y, etc.).

To generate the input metadata, the techniques herein use a script that pulls the different data sources (e.g. Amazon's netrange list) and populates the catalog. This may run daily so the techniques herein are always up to date on which netranges being tracked. One caveat is that the techniques herein may want to track an entire organization when using ASNs, but in certain configurations the organization family IDs aren't stable, so the techniques herein may be configured to generate the list of ASes to track every time the techniques herein run this (e.g., some seed AS may be used for computing a list of all sibling ASes, and then the techniques herein can write them into the appropriate database document).

Figure 4:
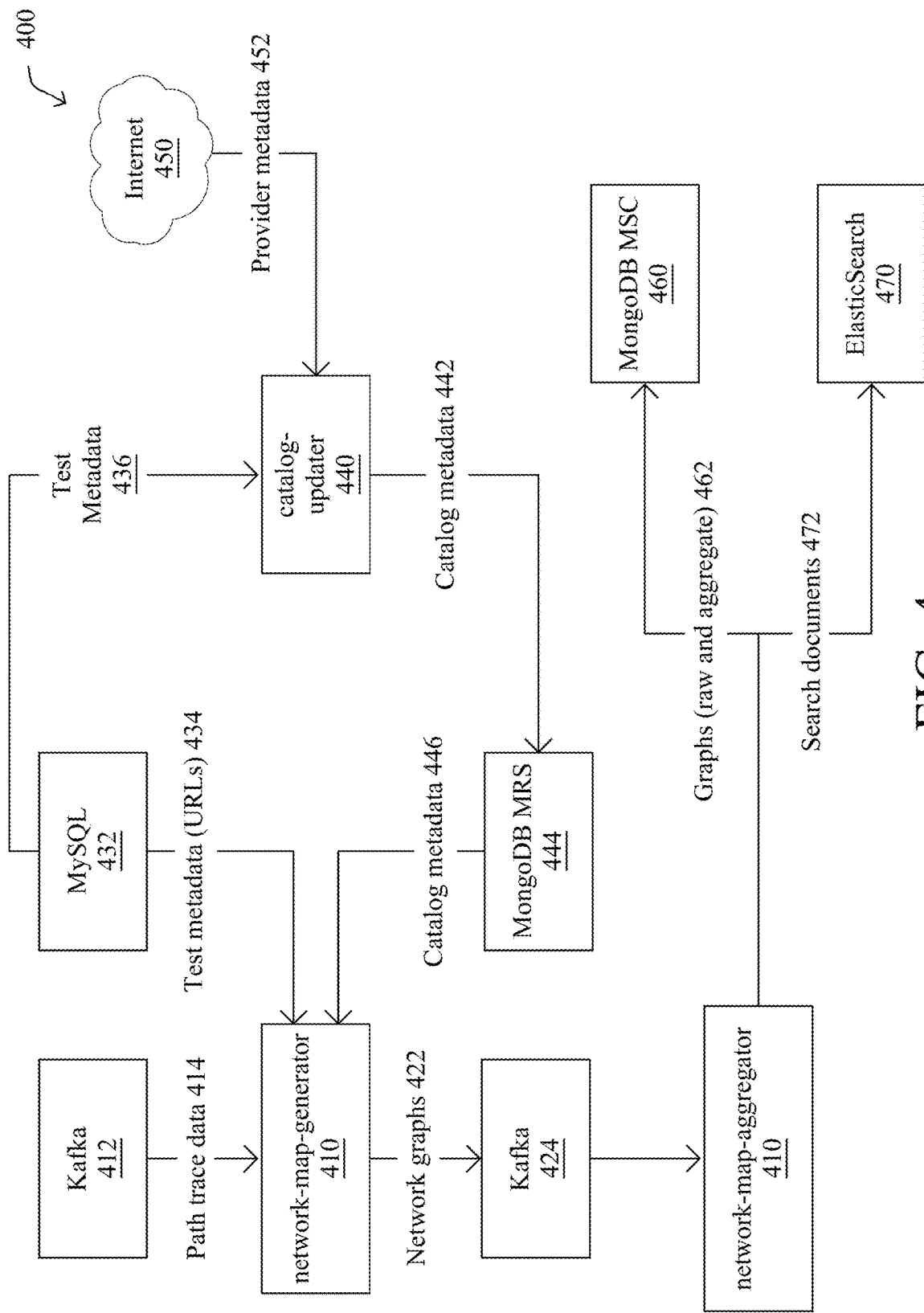
FIG. 4 illustrates an example architecture for network map generation and aggregation in accordance with one or more embodiments described herein.

In accordance with one or more embodiments of the present disclosure, an example overall architecture 400 may be configured as shown in FIG. 4. In particular, a first stage (network map generator 410) will consume from a computing center (e.g., a streaming data feed platform such as kafka) and generate graphs per entry in the catalog (this is down to the lowest level, e.g. "aws:ec2"). That is, the first stage (network map generator 410):

- Loads a catalog. (Essentially, MySQL 432 sends test metadata 436 to a catalog updater 440, which receives provider metadata 452 from the internet 450. The resultant catalog metadata 442 is fed to a MongoDB 444, from which the catalog metadata 446 can be loaded to the network map generator, and correlated to the test metadata 434.)
- Consumes path trace (and other) data 414 from kafka 412 and builds the network maps according to how the catalog specified them.
- Once sufficient (e.g., 2 hours) of data have been consumed (based on round ids), this stage outputs the output graphs 422 into kafka 424 (e.g., with optional partitioning, such as based on number of nodes per document).
- Outputs messages that illustratively use the catalog id+round id as the key so the next stage can aggregate them together easily.

In particular, a second stage of the above architecture, network map aggregator 420, will aggregate the outputs from the first stage by:

- Grouping entries for the same graph generated by different instances of the first stage.
- Building the aggregates at the different layers the techniques herein need.
- Writing the entries (graphs 462, both raw and aggregate) to the database (e.g., mongo 460) and pushing the search documents 472 to a search and analytics solution (e.g., ElasticSearch 470).

Figure 5:
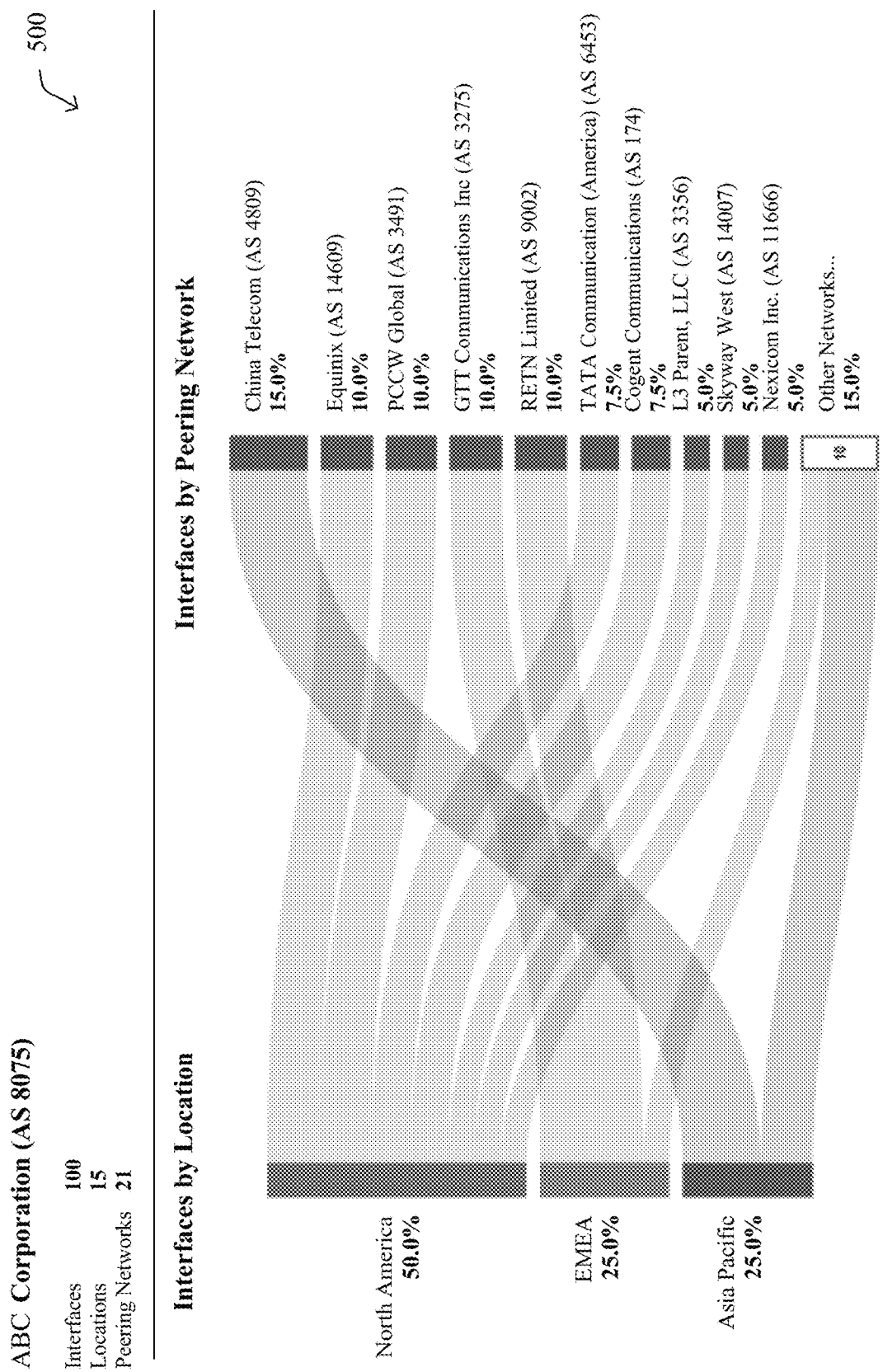
FIG. 5 illustrates an example Sankey diagram based on intuitive graphical network mapping based on collective intelligence in accordance with one or more embodiments described herein.

The visualization of the above collected data is now addressed with reference to an illustrative user interface (UI) incorporating one or more aspects of the techniques herein, such as an intelligent Sankey diagram 500, as shown in FIG. 5. In particular, as described below, a customer may be presented with an interface with some filters to be able to understand certain aspects of connectivity, and to be able to drill down into more specific details and levels of enriched data. For example, assume a certain application or service (e.g., software as a service, sales as a service, security as a service, infrastructure as a service, and so on) wants to be able to see all their service would connect to the Internet using different service providers, as well as various metrics through those service providers.

Assume, for example, as in the diagram 500, that a customer is looking at a particular service provider (e.g., "ABC"), and the techniques herein illustrate all the geos (locations) where ABC has services hosted (e.g., North America, EMEA, Asia Pacific, as shown). On the right hand side, the graph shows the peering connections. So, for example, by looking at Asia Pacific, 25% of the servers of ABC are there, and then 15% of those are connected China Telecom. The techniques herein thus readily provide collected data into a consumable format for users, accordingly.

Figure 6:
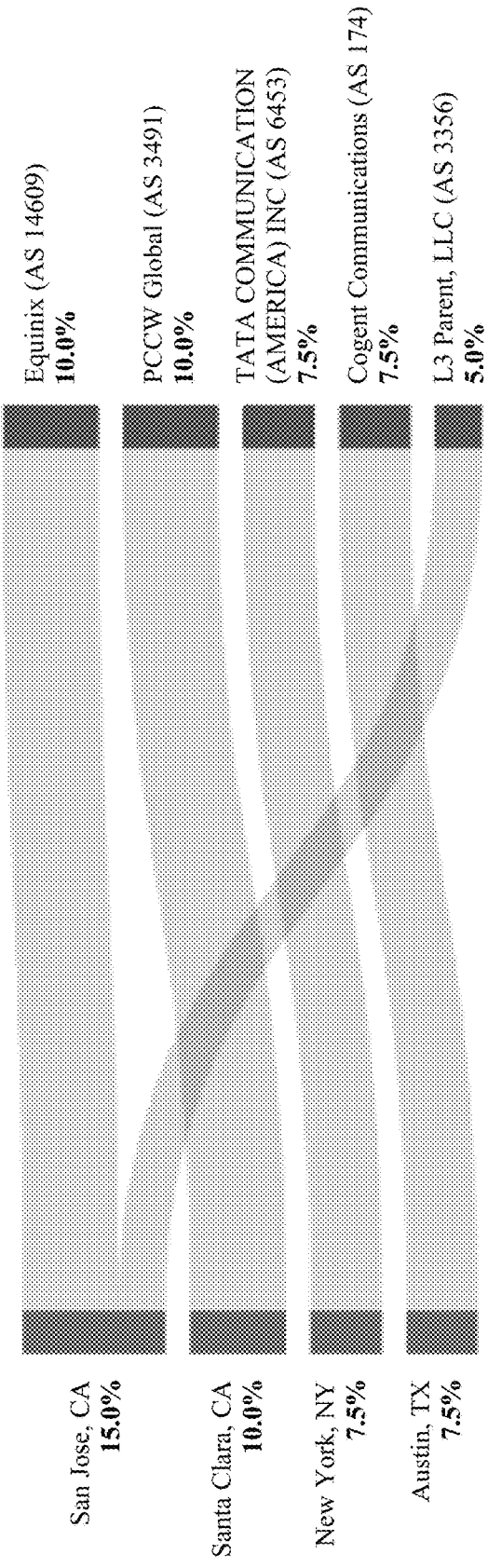
FIG. 6 illustrates another example Sankey diagram based on intuitive graphical network mapping based on collective intelligence in accordance with one or more embodiments described herein.

Note that this view allows for different types of groupings as well. For instance, a user may perform various queries, such as, e.g., "show me all of the providers that I have in the Bay area, New York, and Texas", for example, showing the corresponding interfaces by Peering Network, as seen in Sankey diagram 600 of FIG. 6.

Other type of queries may be used, too, such as, e.g., a customer wants to understand in which geography a particular service provider operates within, and so on. Essentially, the techniques herein provide a Sankey diagram that displays various dimensions selected by a user (e.g., geography, service providers, the peering connections of the service providers, etc.). Users may then click on certain nodes or links to highlight the nodes/links, provide enriched data about the selection, or drill down into the data further, expanding (zooming in on) the data, or otherwise refocusing the view of the data.

For example, assume a user provides a base query, such as east coast servers, and then by clicking on each server, the user may be presented with all the breakdowns of where it has some points of presence (PoPs), and then the user can go even a level further, and for each point of presence, understand what target locations are services by that PoP, and so on. In particular, the user may use various topology filters/drilling (including a "back" button), or specific filter selections, drop down menus, and so on, to achieve this navigation, accordingly.

Note that granularity of the data may also be down to the level of origin ASN/City at the minimum, and optionally origin Prefix/City (e.g., to enable correlation with BGP data).

Note again that the data used to put together the Sankey diagram leverages a collective across many different tests (across many different customers/clients), aggregating the publicly accessible data into a holistic view of the network and the associated applications/services, accordingly. While viewing a graph in the UI, therefore, the techniques herein need to be able to search across several dimensions:

- Specific catalog provider (requires 1 and only 1 selected);
- Transit ASN (for ISPs);
- Location;
- Destinations (these don't apply for ISPs)
    - Destination IP address (free form but map to a set of ranges/prefixes)
    - Destination prefix/netrange
    - Destination ASN
    - Destination domain (should map to an entry in the internet catalog)

Given that the techniques herein need to be able to perform several filters and combinations of them, a search and analytics platform such as ElasticSearch would be an appropriate solution. The techniques herein may also be configured to audit events or the endpoint agent and push documents to ElasticSearch that would allow mapping back to the database ID (e.g., mongo id) of the document that contains the actual data. For example, the techniques herein could push something like:

```
{
"mongoId" : <mongo-id>,
"groupingLevel" : . ..,
"asns" : [ 16509, . ..],
"locations" : [ ...],
....
}
```

That is, whenever the user applies a filter, the techniques herein would send a request to obtain the database document ID where the relevant information is, in order to display that information in the GUI, accordingly.

Some example filters may comprise:
Catalog Provider (e.g., always visible)
Network (ASNs)
Locations
BGP prefix (this is a subset based on the catalog selection)
Peering Networks (ASNs)
Peering Locations Some example metrics may comprise:
Infrastructure metrics:
Interfaces (default)
Locations
Networks (ASNs)
Peering networks (ASNs)
Peering links
Latency metrics:
Peering latency (inter-AS)—latency on the peering links between A and B
Avg peering delay
Min. peering delay
P-90 peering delay
Internal latency (intra-AS)—total time spent inside the network of A; for ISPs this is the transit time, for other providers this is time from the server to the entry/exit point of the network
Avg delay
P-90 delay
Outage metrics
affected interfaces
affected peer interfaces—this is the number of interfaces affected by outages in the peer pops
total affected interfaces (internal+peers)
affected tests
affected locations
outages Note that where the use case of this data is for planning, the techniques herein should use longer time windows on the timeline. However, the techniques herein also allow users to select a window of time in the timeline instead of the classical moving short time window. For example, the techniques herein can have 1 h as the minimum interval the techniques herein can allow in the timeline, but let users define a window of time to aggregate, up to e.g., 30 d. This window of time may be from the current time into the past, or may be a specifically defined time window of historical data.

As more detail on the illustrative use of Sankey diagrams herein, the techniques herein represent in a diagram the footprint of a specific provider, or else starting in a Geo, understand the breakdown of providers and how they connect to the Internet. The techniques herein can achieve this with a three column Sankey, where the order of the columns can be configured and columns can be hidden or shown (need at least 1 column). Illustratively, three available dimensions are:
Catalog Providers (with an option to include ASN breakdown);
Geo-location; and
Peering Network.

The following use cases are supported herein:
User is doing a geo-based query, it starts by having the Geo column first, then Provider column second.
User is doing a provider-based query, the techniques herein can have the provider column first, followed by either the geo column or the peering column.
User is doing a peering based query, the techniques herein can have the Peering column first followed by either the provider or the Geo column.

Figure 7:
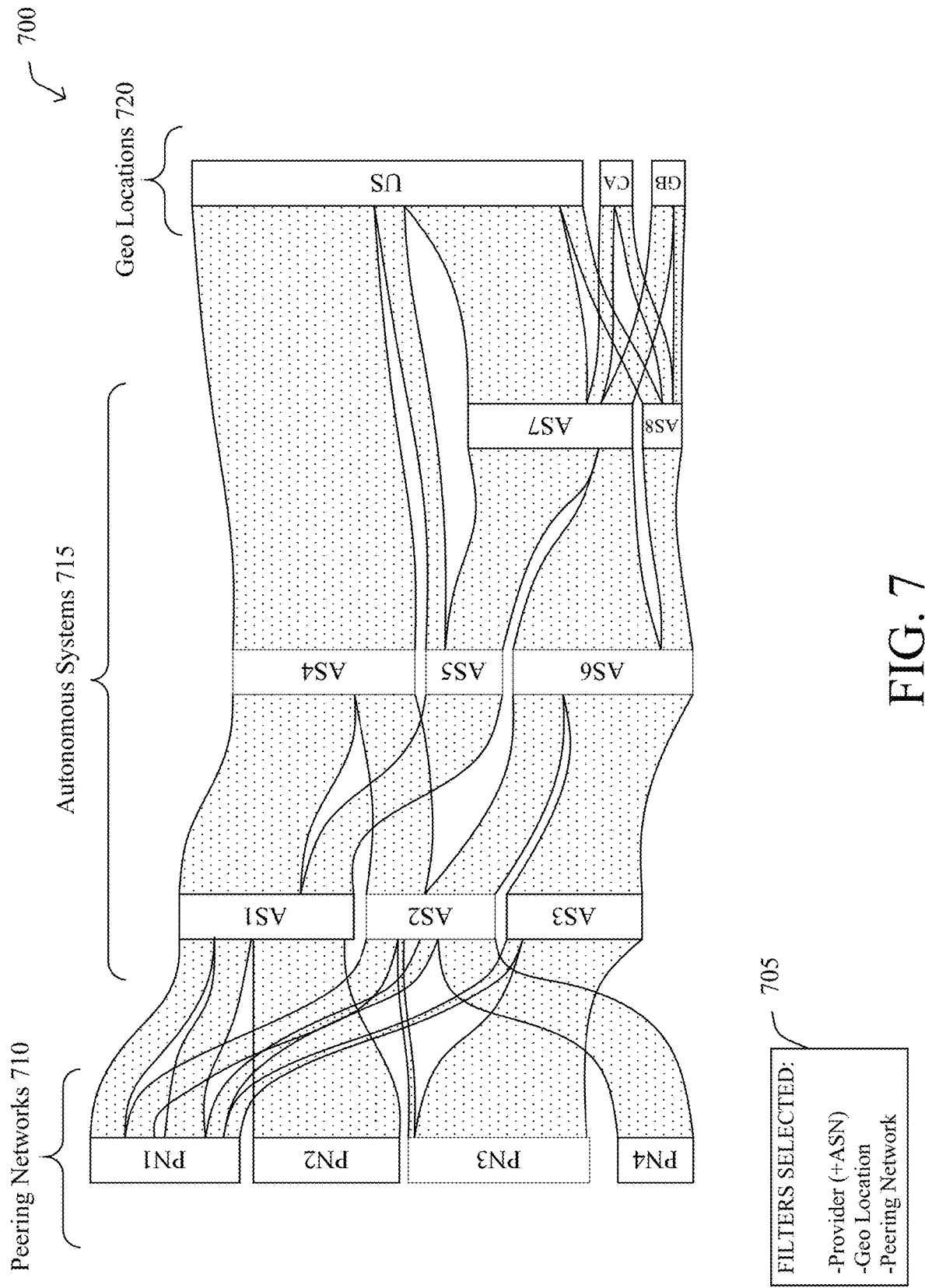
FIG. 7 illustrates an example multi-level Sankey diagram based on intuitive graphical network mapping based on collective intelligence in accordance with one or more embodiments described herein.

An example of selecting Provider (+ASN), Geo, and Peering Network may be seen as the multi-level Sankey diagram 700 of FIG. 7 (with selected filters 705). Note also, in particular, that multi-level Sankey diagram 700 illustrates how intermediate nodes may also be represented between start and end point nodes, accordingly. For example, peering networks 710 traverse multiple providers (and autonomous systems 715), to reach (or are otherwise a part of) certain geographies 720 (e.g., US, Canada, Great Britain, etc.). Any suitable visualization of nodes may be made within a multi-level Sankey diagram, and those shown in FIG. 7 are merely an example.

Notably, peering interfaces might not be local to the provider interface, e.g., link between A and B, where A is in one location and B is in another. The techniques herein may thus filter out peering interfaces that are not co-located with the provider since they will impact latency metrics. For example, the techniques herein can have a control to show all peering links, only local peering links, only remote peering links (remote peering should have the location where the peering is present), and so on.

In accordance with one or more embodiments herein, the techniques herein may also provide various metrics with the visual topology, e.g., as an overlay. For example, latency may be indicated in the topology (e.g., the internal latencies and peering latencies) on the links, such as by having a highlight control to signal (e.g., in red) links above a certain latency. Also, the techniques herein may highlight/indicate in the catalog provider the number of interfaces involved in outages and in the peering network side the number of interfaces that have experienced outages in the peer PoP over the window of time. This gives an indication of the loss events happening in each PoP.

Note that the techniques herein may also apply intelligent pagination schemes (pagination allows showing additional blocks not visible in the page), where basically for each column the techniques herein rank groups by number of interfaces they contain, and for each column show top N groups, where N is the page size. The techniques herein may thus pick a Sankey visualization algorithm that minimizes the crossings between columns.

Other considerations herein include views of a world map showing the different metrics per location on a world map, and tables showing tabulated totals corresponding to the current view. For example, such tables may illustrate:
By Catalog Provider:
Catalog Provider
ASN
Number of locations
Number of interfaces
Number of peering networks
By Location:
Location
Number of catalog providers
Number of interfaces
Number of peering networks
By Peering Network:
Peering network
Number of catalog providers
Number of locations
Number of peering links Ungrouped:
  Catalog Provider
  ASN
  Location
  Number of interfaces
  Number of peering networks Advantageously, the techniques herein provide intuitive graphical network mapping based on collective intelligence. For instance, through data collection using various testing techniques (e.g., proactive probes), application and service level network views, with many different vantage points (e.g., hundreds to thousands), can be assimilated to show interconnections between service providers, peering networks, applications, servers, PoPs, and so on, filtered by geolocation and other factors, demonstrating enriched data (e.g., latency, errors, outages, etc.) in a scalable manner, notably without requiring any instrumentation inside the individual networks. In particular, the techniques herein aggregate a plethora of available data, overlapping tests from different clients/customers all around the world over time, producing a dense picture of how all these networks are connected to each other at the granular level of applications and services (i.e., more than merely simple routing table topology data, neighboring devices, connectivity, etc.).

Figure 8:
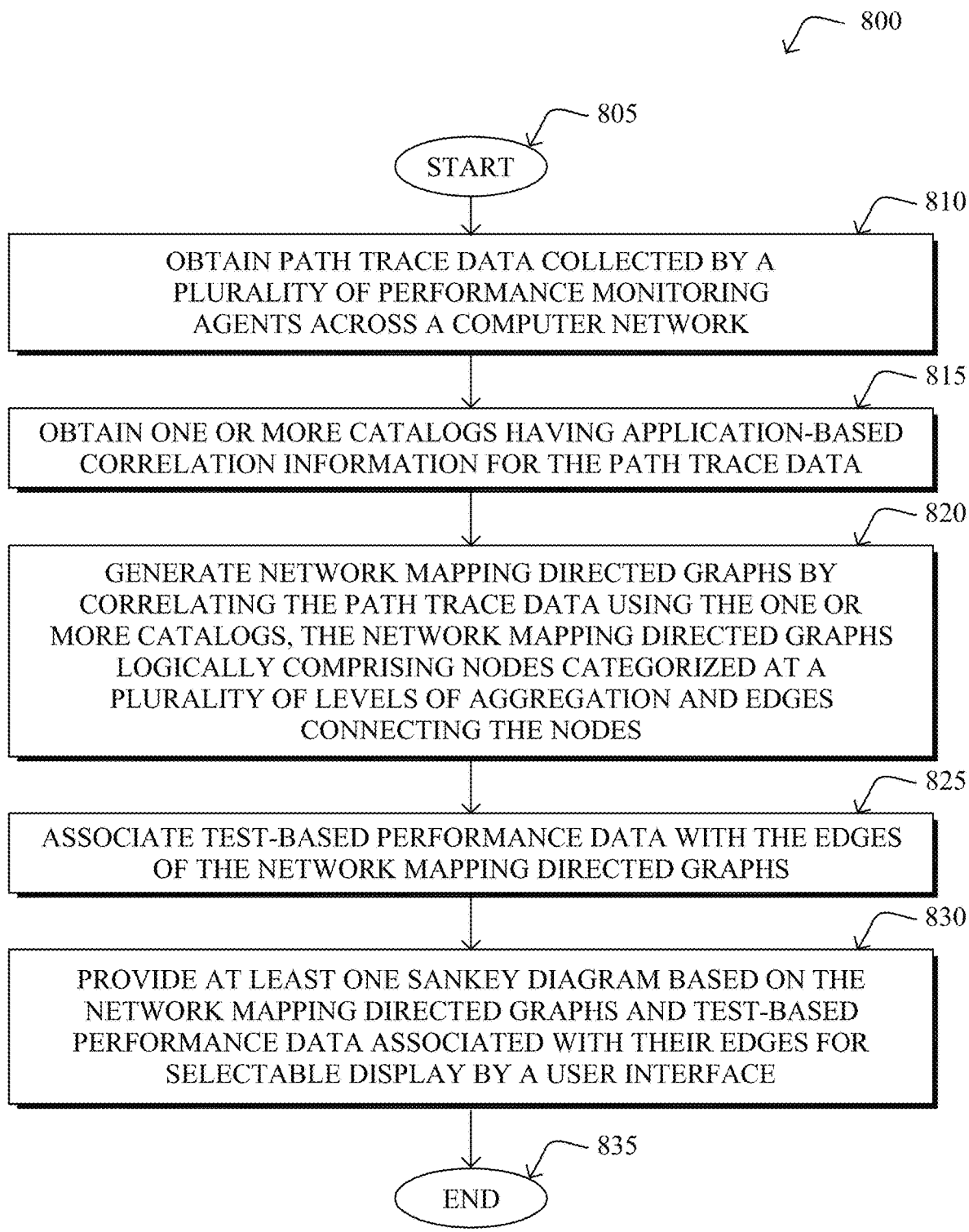
FIG. 8 illustrates an example simplified procedure for intuitive graphical network mapping based on collective intelligence in accordance with one or more embodiments described herein.

In closing, FIG. 8 illustrates an example simplified procedure for intuitive graphical network mapping based on collective intelligence, in accordance with one or more embodiments described herein. For example, a non-generic, specifically configured device (e.g., device 200, such as a network mapping device) may perform procedure 800 by executing stored instructions (e.g., process 248). The procedure 800 may start at step 805, and continues to step 810, where, as described in greater detail above, the techniques herein obtain path trace data collected by a plurality of performance monitoring agents across a computer network. As noted, the agents may be both cloud agents and enterprise agents, and optionally application end point agents, and may, in particular, be controlled by a plurality of different management entities (e.g., different customers). In one embodiment, the techniques herein may first ensure a sufficient collection of path trace data has been obtained prior to generating the network mapping directed graphs.

In step 815, the techniques herein may also obtain one or more catalogs having application-based correlation information for the path trace data. Optionally, the techniques may use either all of the applications of the catalog, or else may select a subset of available applications from within the one or more catalogs for inclusion within the network mapping directed graphs.

In step 820, the techniques herein may then generate network mapping directed graphs by correlating the path trace data using the one or more catalogs, as described in greater detail above. In particular, the network mapping directed graphs logically comprise nodes categorized at a plurality of levels of aggregation and edges connecting the nodes (e.g., where the nodes may be categorically units such as interfaces, locations, services, prefixes, devices, peering networks, applications, servers, points of presence (PoPs), ISPs, and so on.

In step 825, the techniques herein may also associate test-based performance data (e.g., latency, drops, errors, outages, etc.) with the edges of the network mapping directed graphs.

Accordingly, in step 830, the techniques herein may then provide at least one Sankey diagram based on the network mapping directed graphs and test-based performance data associated with their edges for selectable display by a user interface. Note that in one embodiment, this process is a backend process, and the user interface is a frontend process configured to receive aggregated views of the network mapping directed graphs as pre-created Sankey diagrams, as noted above. As such, step 830 may comprise writing the at least one Sankey diagram to a database (e.g., divided into logical sub-graphs for storage), and pushing least one associated search document to a search and analytics application. This way, the user interface can make one or more selections of nodes to include within the at least one Sankey diagram (e.g., searches, queries, filters, drill-downs, etc.), particularly allowing for expanding and contracting between one or more levels of aggregated nodes and corresponding pluralities of more granular nodes (e.g., geographical locations to actual devices to interfaces on the devices, and back). Also, in one embodiment, the test-based performance data may correspond to one or more selected historical time frames, and a different Sankey diagram may be established for each time frame.

The procedure 800 may then end in step 835, notably with the ability to continue ingesting and processing data. Other steps may also be included generally within procedure 800, such as, e.g., selecting a specific Sankey visualization algorithm that minimize crossings between columns for pagination within the at least one Sankey diagram, providing one or more tables based on summarized test-based performance data associated with the at least one Sankey diagram, and so on.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, the techniques described herein may be performed by hardware, software, and/or firmware, such as in accordance with the illustrative network maps view process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, by a process, path trace data collected by a plurality of performance monitoring agents across a computer network; obtaining, by the process, one or more catalogs having application-based correlation information for the path trace data; generating, by the process, network mapping directed graphs by correlating the path trace data using the one or more catalogs, the network mapping directed graphs logically comprising nodes categorized at a plurality of levels of aggregation and edges connecting the nodes; associating, by the process, test-based performance data with the edges of the network mapping directed graphs; and providing, by the process, at least one Sankey diagram based on the network mapping directed graphs and test-based performance data associated with their edges for selectable display by a user interface.

In one embodiment, the method further comprises: ensuring a sufficient collection of path trace data prior to generating the network mapping directed graphs.

In one embodiment, providing comprises: writing the at least one Sankey diagram to a database; and pushing at least one search document associated with the at least one Sankey diagram to a search and analytics application.

In one embodiment, the nodes are selected from a group consisting of: interfaces; locations; services; prefixes; devices; peering networks; applications; servers; points of presence; and service providers.

In one embodiment, the plurality of performance monitoring agents comprise both cloud agents and enterprise agents. In one embodiment, the plurality of performance monitoring agents further comprise application end point agents.

In one embodiment, the process comprises a backend process, and wherein the user interface comprises a frontend process configured to receive aggregated views of the network mapping directed graphs as pre-created Sankey diagrams.

In one embodiment, the at least one Sankey diagram provides for expanding and contracting between one or more levels of aggregated nodes and corresponding pluralities of more granular nodes.

In one embodiment, the at least one Sankey diagram is divided into logical sub-graphs for storage.

In one embodiment, the plurality of performance monitoring agents are controlled by a plurality of different management entities.

In one embodiment, the method further comprises: selecting a subset of available applications from within the one or more catalogs for inclusion within the network mapping directed graphs.

In one embodiment, the method further comprises: selecting a specific Sankey visualization algorithm that minimize crossings between columns for pagination within the at least one Sankey diagram.

In one embodiment, selectable display by a user interface is based on one or more selections of nodes to include within the at least one Sankey diagram.

In one embodiment, the test-based performance data correspond to one or more selected historical time frames.

In one embodiment, the method further comprises: providing one or more tables based on summarized test-based performance data associated with the at least one Sankey diagram.

In one embodiment, the test-based performance data is selected from a group consisting of: latency; drops; errors; and outages.

According to the embodiments herein, an illustrative tangible, non-transitory, computer-readable medium herein may have computer-executable instructions stored thereon that, when executed by a processor on a device, may cause the device to perform a method comprising: obtaining path trace data collected by a plurality of performance monitoring agents across a computer network; obtaining one or more catalogs having application-based correlation information for the path trace data; generating network mapping directed graphs by correlating the path trace data using the one or more catalogs, the network mapping directed graphs logically comprising nodes categorized at a plurality of levels of aggregation and edges connecting the nodes; associating test-based performance data with the edges of the network mapping directed graphs; and providing at least one Sankey diagram based on the network mapping directed graphs and the test-based performance data associated with their edges for selectable display by a user interface.

Further, according to the embodiments herein an illustrative apparatus herein may comprise: one or more network interfaces to communicate with a network; a processor coupled to the network interfaces and configured to execute one or more processes; and a memory configured to store a process executable by the processor, the process, when executed, configured to: obtain path trace data collected by a plurality of performance monitoring agents across a computer network; obtain one or more catalogs having application-based correlation information for the path trace data; generate network mapping directed graphs by correlating the path trace data using the one or more catalogs, the network mapping directed graphs logically comprising nodes categorized at a plurality of levels of aggregation and edges connecting the nodes; associate test-based performance data with the edges of the network mapping directed graphs; and provide at least one Sankey diagram based on the network mapping directed graphs and test-based performance data associated with their edges for selectable display by a user interface.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the network/application intelligence platform (e.g., application agents, network agents, enterprise agents, cloud agents, endpoint agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents, the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, by a process, path trace data collected by a plurality of performance monitoring agents that proactively send probe packets across a computer network;
    obtaining, by the process, one or more catalogs having application-based correlation information for the path trace data indicative of how to track a service provider or application;
    generating, by the process, network mapping directed graphs by correlating the path trace data and by using the one or more catalogs, the network mapping directed graphs logically comprising nodes that are identified by provider name, service, and region within the one or more catalogs and are further categorized at a plurality of levels of aggregation and edges connecting the nodes;
    associating, by the process, test-based performance data with the edges of the network mapping directed graphs; and
    providing, by the process, at least one Sankey diagram based on the network mapping directed graphs and test-based performance data associated with their edges for selectable display by a user interface.

2. The method as in claim 1, further comprising:
    ensuring a sufficient collection of path trace data prior to generating the network mapping directed graphs.

3. The method as in claim 1, wherein providing comprises:
    writing the at least one Sankey diagram to a database; and
    pushing at least one search document associated with the at least one Sankey diagram to a search and analytics application.

4. The method as in claim 1, wherein the nodes are selected from a group consisting of: interfaces; locations; services; prefixes; devices; peering networks; applications; servers; points of presence; and service providers.

5. The method as in claim 1, wherein the plurality of performance monitoring agents comprise both cloud agents and enterprise agents.

6. The method as in claim 5, wherein the plurality of performance monitoring agents further comprise application end point agents.

7. The method as in claim 1, wherein the process comprises a backend process, and wherein the user interface comprises a frontend process configured to receive aggregated views of the network mapping directed graphs as pre-created Sankey diagrams.

8. The method as in claim 1, wherein the at least one Sankey diagram provides for expanding and contracting between one or more levels of aggregated nodes and corresponding pluralities of more granular nodes.

9. The method as in claim 1, wherein the at least one Sankey diagram is divided into logical sub-graphs for storage.

10. The method as in claim 1, wherein the plurality of performance monitoring agents are controlled by a plurality of different management entities.

11. The method as in claim 1, further comprising:
    selecting a subset of available applications from within the one or more catalogs for inclusion within the network mapping directed graphs.

12. The method as in claim 1, further comprising:
    selecting a specific Sankey visualization algorithm that minimize crossings between columns for pagination within the at least one Sankey diagram.

13. The method as in claim 1, wherein selectable display by a user interface is based on one or more selections of nodes to include within the at least one Sankey diagram.

14. The method as in claim 1, wherein the test-based performance data correspond to one or more selected historical time frames.

15. The method as in claim 1, further comprising:
    providing one or more tables based on summarized test-based performance data associated with the at least one Sankey diagram.

16. The method as in claim 1, wherein the test-based performance data is selected from a group consisting of: latency; drops; errors; and outages.

17. A tangible, non-transitory, computer-readable medium having computer-executable instructions stored thereon that, when executed by a processor on a computer, cause the computer to perform a method comprising:
    obtaining path trace data collected by a plurality of performance monitoring agents that proactively send probe packets across a computer network;
    obtaining one or more catalogs having application-based correlation information for the path trace data indicative of how to track a service provider or application;
    generating network mapping directed graphs by correlating the path trace data and by using the one or more catalogs, the network mapping directed graphs logically comprising nodes that are identified by provider name, service, and region within the one or more catalogs and are further categorized at a plurality of levels of aggregation and edges connecting the nodes;
    associating test-based performance data with the edges of the network mapping directed graphs; and
    providing at least one Sankey diagram based on the network mapping directed graphs and the test-based performance data associated with their edges for selectable display by a user interface.

18. The tangible, non-transitory, computer-readable medium as in claim 17, wherein the at least one Sankey diagram provides for expanding and contracting between one or more levels of aggregated nodes and corresponding pluralities of more granular nodes.

19. The tangible, non-transitory, computer-readable medium as in claim 17, wherein selectable display by a user interface is based on one or more selections of nodes to include within the at least one Sankey diagram.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
obtain path trace data collected by a plurality of performance monitoring agents that proactively send probe packets across a computer network;
obtain one or more catalogs having application-based correlation information for the path trace data indicative of how to track a service provider or application;
generate network mapping directed graphs by correlating the path trace data and by using the one or more catalogs, the network mapping directed graphs logically comprising nodes that are identified by provider name, service, and region within the one or more catalogs and are further categorized at a plurality of levels of aggregation and edges connecting the nodes;
associate test-based performance data with the edges of the network mapping directed graphs; and
provide at least one Sankey diagram based on the network mapping directed graphs and test-based performance data associated with their edges for selectable display by a user interface.

\* \* \* \* \*